Feb. 26, 1963   M. P. ANFINSON   3,079,017
SILAGE DISTRIBUTOR
Filed May 2, 1960
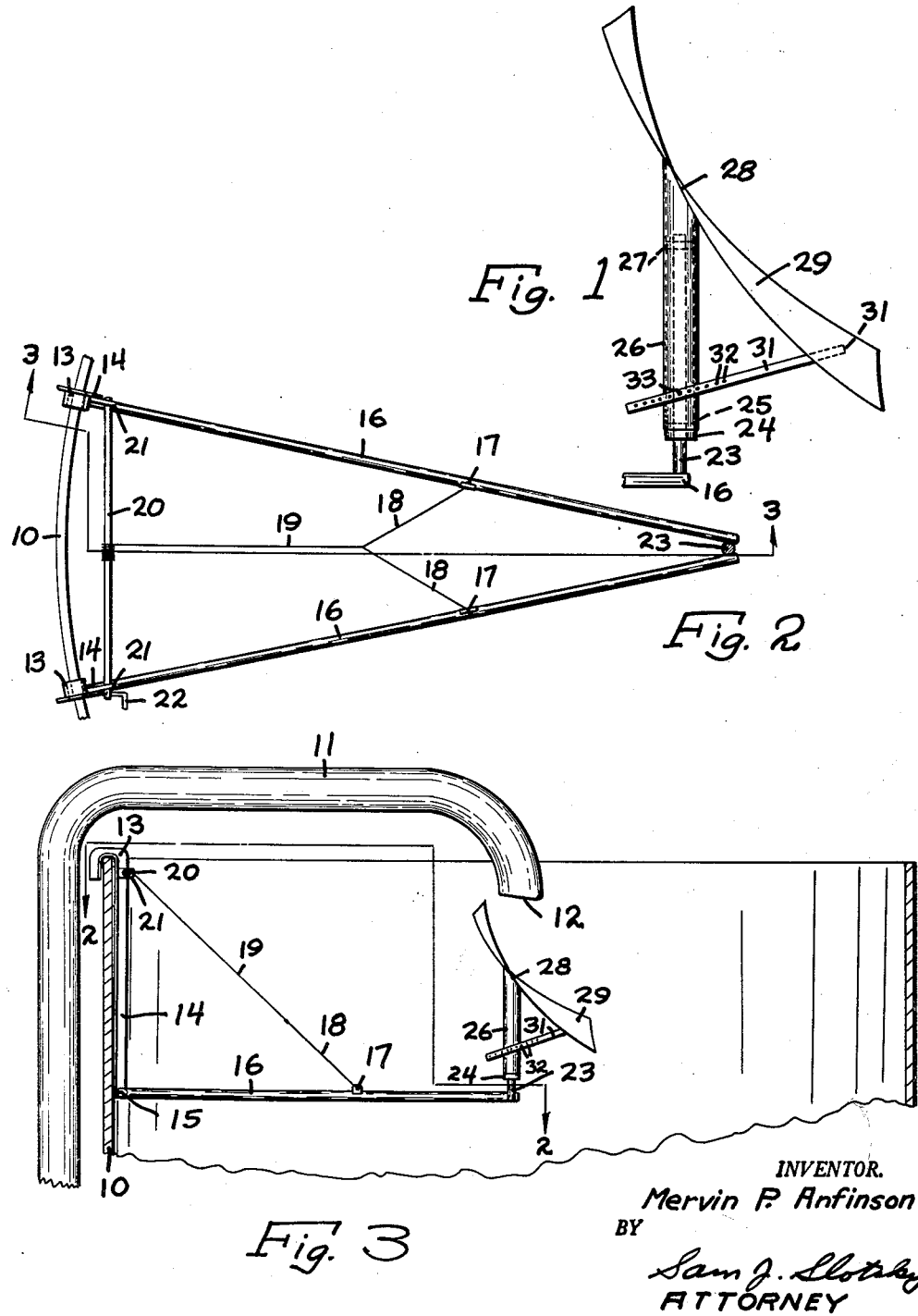
INVENTOR.
Mervin P. Anfinson
BY
Sam J. Slotsky
ATTORNEY

United States Patent Office 3,079,017
Patented Feb. 26, 1963

3,079,017
SILAGE DISTRIBUTOR
Mervin P. Anfinson, Pierson, Iowa
Filed May 2, 1960, Ser. No. 26,057
1 Claim. (Cl. 214—17)

My invention relates to a silage distributor.

An object of my invention is to provide a distributor in which silage or other material can be uniformly distributed in a circular silo.

A further object of my invention is to provide an adjustable arrangement and a special framework for raising the arrangement to the necessary position for operation.

With these and other objects in view, my invention consists in the construction, arrangement, and combination of the various parts of my device, whereby the objects contemplated are attained, as hereinafter more fully set forth, pointed out in my claim, and illustrated in the accompanying drawings, in which:

FIGURE 1 is an enlarged detail of the pitched distributor mechanism,

FIGURE 2 is a sectional view taken generally along the lines 2—2 of FIGURE 3, and FIGURE 3 is a sectional view taken generally along the lines 3—3 of FIGURE 2.

I have used the character 10 to designate the wall of a circular silo which is to be filled by means of the spout 11 terminating in the opening at 12.

Receiving the upper edge of the wall 10 are the bent-over portions 13 of the vertically positioned angle members 14 to which are pivoted at 15 the lengthened bars 16 to which are attached at 17 the cables 18 terminating in the cable 19 which is wound about the circular windlass rod 20 which is journalled to the brackets 21 which are attached to the portions 13. Attached to the windlass 20 is the turning handle 22 which can be locked when desired by any suitable means or when the unit is in position.

Attached to the ends of the rods 16 is a vertical post 23 to which is attached a lower bearing 24 upon which rests the disc 25 which is secured within a pipe 26, the rod 23 also being journalled within a further disc member 27 which is attached to the pipe 26.

Suitably welded or otherwise secured at 28 to the top of the pipe 26 is a lengthened pitched sheet 29 which is made of any suitable desired material, this sheet being pitched both outwardly and laterally. The element 29 can be made of sheet metal or any other similar type of device, as long as it is pitched approximately as shown.

Suitably attached at 30 is a strap 31 having a series of openings 32, any one of which openings is received over a stud 33 which is attached to the pipe 26, the strap 31 providing means for altering the pitch of the arrangement if such is desired.

When first installing the unit, the rods or bars 16 will occupy a vertical position along the wall 10 of the silo, after which the windlass 20 is rotated, which through the cables 19 and 18 will raise the unit to the position shown, with the pipe 26 being substantially centrally located, this arrangement thereby rendering the unit easier of installation since by this arrangement it will not be necessary to balance and adjust a horizontally positioned unit at the beginning of the installation. As explained above, the handle 22 can be locked in any suitable manner by a pin or other device after the unit is raised.

When the material is fed through the housing 11 and through the opening 12, it will impinge on the pitched blade 29 substantially just above the pipe 26, and this impingement will cause the blade 29 as well as the pipe 26 to rotate on the rod 23, and this rotation will cause the material to be uniformly distributed annularly beneath the same so that the silo will be uniformly filled and at the same time the mass of the distributed silage will be more uniform in texture.

The pitched member 29 provides the important function of distributing the material radially as well as laterally from the blade, and therefore provides the functions above explained.

It will now be seen that I have provided the advantages mentioned in the objects of my invention with further advantages being readily apparent.

Some changes may be made in the construction and arrangement of the parts of my invention without departing from the real spirit and purpose of my invention, and it is my intention to cover by my claim any modified forms of structure or use of mechanical equivalents which may be reasonably included within their scope.

I claim as my invention:

A silage distributor comprising a framework, a vertically mounted rotatable unit mounted at the end of said framework, said rotatable unit including a blade, said blade being angularly pitched with respect to the longitudinal vertical axis of said unit, said blade being laterally pitched whereby said blade will be rotated when silage material falls on the same, means for journaling said blade including a vertically positioned rod attached to said framework, a female pipe receiving said rod, said female pipe being attached to said blade, said rod and said pipe being positioned substantially in alignment with the center of a material discharging pipe, said distributor being mounted so as to be positioned substantially centrally of a silo, said blade including a lower portion extending to a substantially greater length from the journaling point of said blade than to the upper end of said blade, the lateral pitching of said blade being opposed at each end thereof to also provide means where material will be received and thrown centrifugally from the lower end of said blade.

References Cited in the file of this patent
UNITED STATES PATENTS

| | | |
|---|---|---|
| 1,389,402 | Vogel | Aug. 30, 1921 |
| 1,691,683 | Townsend | Nov. 13, 1928 |
| 2,791,887 | Hennig | May 14, 1957 |
| 2,834,483 | Friedman | May 13, 1958 |
| 2,940,573 | Schultz | June 14, 1960 |